(12) United States Patent
Morishima et al.

(10) Patent No.: US 8,095,742 B2
(45) Date of Patent: Jan. 10, 2012

(54) MICROCOMPUTER WITH ADDRESS TRANSLATION CIRCUIT

(75) Inventors: Kenta Morishima, Kodaira (JP); Naoki Kato, Kodaira (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 346 days.

(21) Appl. No.: 12/369,055

(22) Filed: Feb. 11, 2009

(65) Prior Publication Data
US 2009/0216974 A1 Aug. 27, 2009

(30) Foreign Application Priority Data
Feb. 22, 2008 (JP) ................... 2008-041291

(51) Int. Cl.
*G06F 12/00* (2006.01)
(52) U.S. Cl. ................. 711/147; 711/202; 711/E12.058
(58) Field of Classification Search ................... 711/147, 711/168, 202, E12.058
See application file for complete search history.

(56) References Cited

U.S. PATENT DOCUMENTS
2003/0065933 A1* 4/2003 Hashimoto et al. ........... 713/194
2006/0179436 A1* 8/2006 Yasue ........................... 718/100

FOREIGN PATENT DOCUMENTS
JP 09-146904 A 6/1997
* cited by examiner

*Primary Examiner* — Jasmine Song
(74) *Attorney, Agent, or Firm* — Miles & Stockbridge P.C.

(57) ABSTRACT

A microcomputer includes a first CPU, a first bus, a first memory, a second CPU, a second bus, and a second memory. The first memory and the second memory are arranged in address spaces individually managed by the first CPU and the second CPU corresponding to the memories. An address translation circuit is provided. When a task so programmed to have a data area in the first memory is transferred to the second memory and executed by the second CPU, the address translation circuit carries out the following processing: the address translation circuit translates an address outputted from the second CPU so that access to the first memory by the task becomes access to the second memory. As a result, the number of access cycles is reduced and degradation in computing capability is avoided when a task is transferred between CPUs for load sharing.

6 Claims, 4 Drawing Sheets

200

| Task | URAM(0)50 Initial address | Size | URAM(1)60 Initial address | Valid URAM |
|---|---|---|---|---|
| | R1 | R2 | R3 | flag |
| Task A | 0xxx10 | n1 | 1xx60 | 0 |
| Task B | 0xxx30 | n2 | 1xx80 | 0 |
| Task C | 0xxx47 | n3 | 1xxA0 | 1 |
| Task D | 0xxx60 | n4 | 1xxxC0 | 0 |
| ... | ... | ... | ... | ... |

| Task | URAM(0)50 Initial address | Size | URAM(1)60 Initial address | Valid URAM |
|---|---|---|---|---|
| | R1 | R2 | R3 | flag |
| Task A | 0xxx10 | n1 | 1xx60 | 0 |
| Task B | 0xxx30 | n2 | 1xx80 | 0 |
| Task C | 0xxx47 | n3 | 1xxA0 | 1 |
| Task D | 0xxx60 | n4 | 1xxxC0 | 0 |
| ... | ... | ... | ... | ... |

200

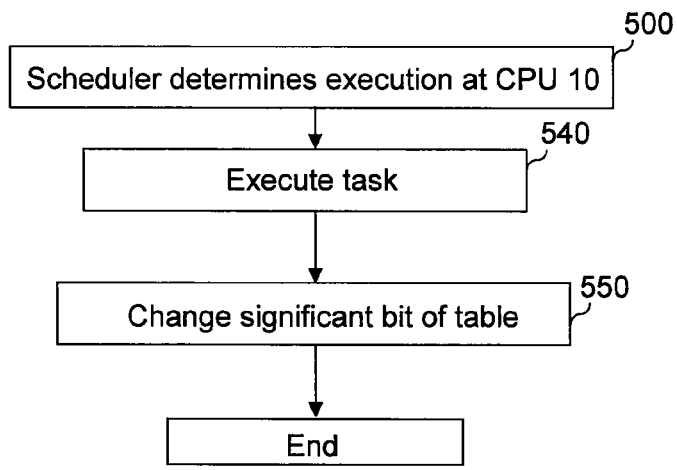
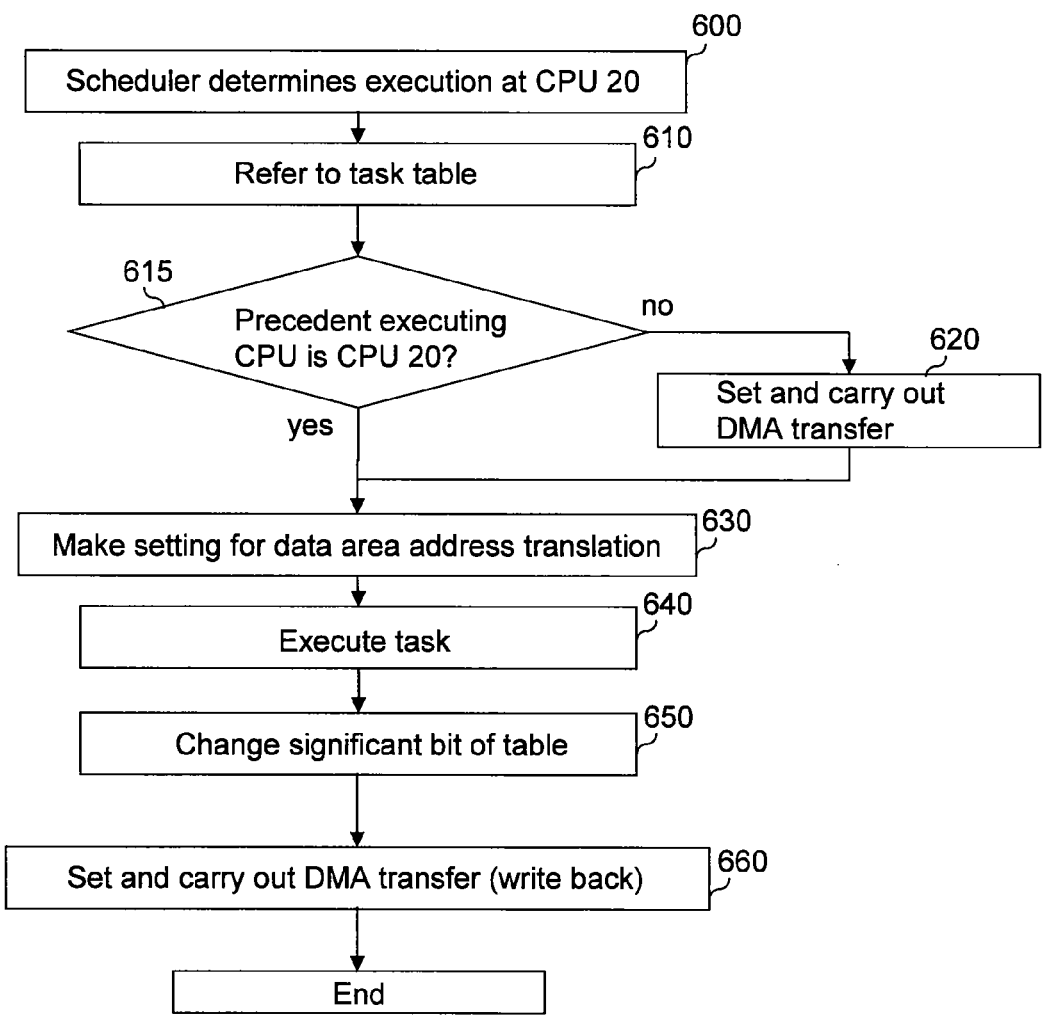

MICROCOMPUTER WITH ADDRESS TRANSLATION CIRCUIT

CLAIM OF PRIORITY

The Present application claims priority from Japanese application JP 2008-041291 filed on Feb. 22, 2008, the content of which is hereby incorporated by reference into this application.

FIELD OF THE INVENTION

The present invention relates to a microcomputer and a parallel distributed processing technology for multiple processors included in the microcomputer to cooperatively execute processing.

BACKGROUND OF THE INVENTION

Microcomputers are also referred to as microprocessors. As the throughput capacity is enhanced, microprocessors of multi-core configuration (referred to as "multi-core processor") high in processing performance per power consumption have received attention in the field of embedded devices as well.

Microprocessors of multi-core configuration are classified into those of symmetric multi processor (SMP: Symmetric Multi Processor) configuration and asymmetric multi processor (AMP: Asymmetric Multi Processor) configuration. The symmetric multi processor (SMP) is so constructed that the multiple CPUs incorporated in the processor completely evenly operate and the same operation and processing can be carried out in every CPU. That is, the symmetric multi processor is a system in which there is no CPU to which master operation is solely assigned and all the CPUs take partial charge of operating system (OP) functions and the like. In the symmetric multi processor SMP, processes are divided by dividing a task into threads and can be distributedly carried out by any processor. Therefore, the symmetric multi processor lacks certainty with respect to task execution time and sequence and real-time performance.

A system including a symmetric multi processor is capable of simultaneously executing threads in proportion to the number of CPUs by assigning the individual threads to the CPUs and this makes it possible to enhance the processing performance of the entire system. In asymmetric multi processors (AMPs), meanwhile, the use of each CPU is predetermined and each CPU is not used for uses other than the predetermined use.

One of examples of documents in which a parallel distributed processing system is described is Patent Document 1. In the parallel distributed processing system in Patent Document 1, the address spaces of each processor are divided into spaces shared among multiple threads and spaces such as stacks not shared among threads. Each processor is provided with a CPU address-logical address translation circuit. When the latter space, or the non-shared space, is accessed, the value of a base register is added to the access request address and address translation is carried out. The address spaces such as stacks are thereby relativized so that parallel translation can be arbitrarily carried out.

[Patent Document 1] Japanese Unexamined Patent Publication No. Hei 9(1997)-146904

SUMMARY OF THE INVENTION

In asymmetric multi processors, it is required to determine the assignment of tasks with respect to each core beforehand. Under heavy load, in this case, one CPU is loaded and the CPU processing performance becomes deficient and there is a possibility that a task cannot be executed within a predetermined time. It is difficult to estimate a load beforehand to perfectly assign tasks. To cope with this, the present inventors discussed the following method: when there is a possibility that a first CPU cannot complete the processing of a task within a predetermined time, the task is moved to a second CPU and executed (processed) there. According to the result of the discussion, the following takes place, for example, when a periodic task being executed at a first CPU core is executed at a second CPU in the next and following periods: since the static variable of the task exists in the local memory of the first CPU, the local memory of the first CPU is accessed by the second CPU each time with respect to the task. As a result, the latency of access to the static variable is increased as compared with cases where the task is executed at the first CPU. In addition, the probability of occurrence of the conflict of access to the first local memory between the first CPU and the second CPU is increased and thus degradation in computing capability is expected. The present inventors found that the following takes place when a task is transferred between CPUs for load sharing in a multi-core asymmetric multi processor having a local memory for each CPU: the other CPU's local memory is frequently accessed and this increases access latency; and access is concentrated on either local memory and a conflict occurs. As a result, the performance is degraded.

It is an object of the invention to provide a technology for avoiding degradation in computing capability when a task is transferred between CPUs for load sharing.

The above and other objects and novel features of the invention will be apparent from the description in this specification and the accompanying drawings.

The following is a brief description of the gist of the representative elements of the invention disclosed in this application:

A microcomputer includes a first CPU, a first bus, a first memory, a second CPU, a second bus, and a second memory. The first memory and the second memory are arranged in address spaces individually managed by the first CPU and second CPU corresponding to the memories. An address translation circuit (160) is provided. When a task so programmed that the task has a data area in the first memory is transferred to the second memory and executed by the second CPU, the address translation circuit translates an address outputted from the second CPU so that access to the first memory by the task becomes access to the second memory. The number of access cycles is thereby reduced to avoid degradation in computing capability when a task is transferred between CPUs for load sharing.

The following is a brief description of the effect obtained by the representative elements of the invention disclosed in this application:

Degradation in computing capability can be avoided when a task is transferred between CPUs for load sharing.

BRIEF DESCRIPTION OF THE DRAWINGS

FIG. 7 is a flowchart illustrating a major operation in the above microcomputer; and FIG. 8 is a flowchart illustrating a major operation in the above microcomputer.

DETAILED DESCRIPTION OF THE PREFERRED EMBODIMENTS

1. Summary of the Preferred Embodiments

Figure 1:
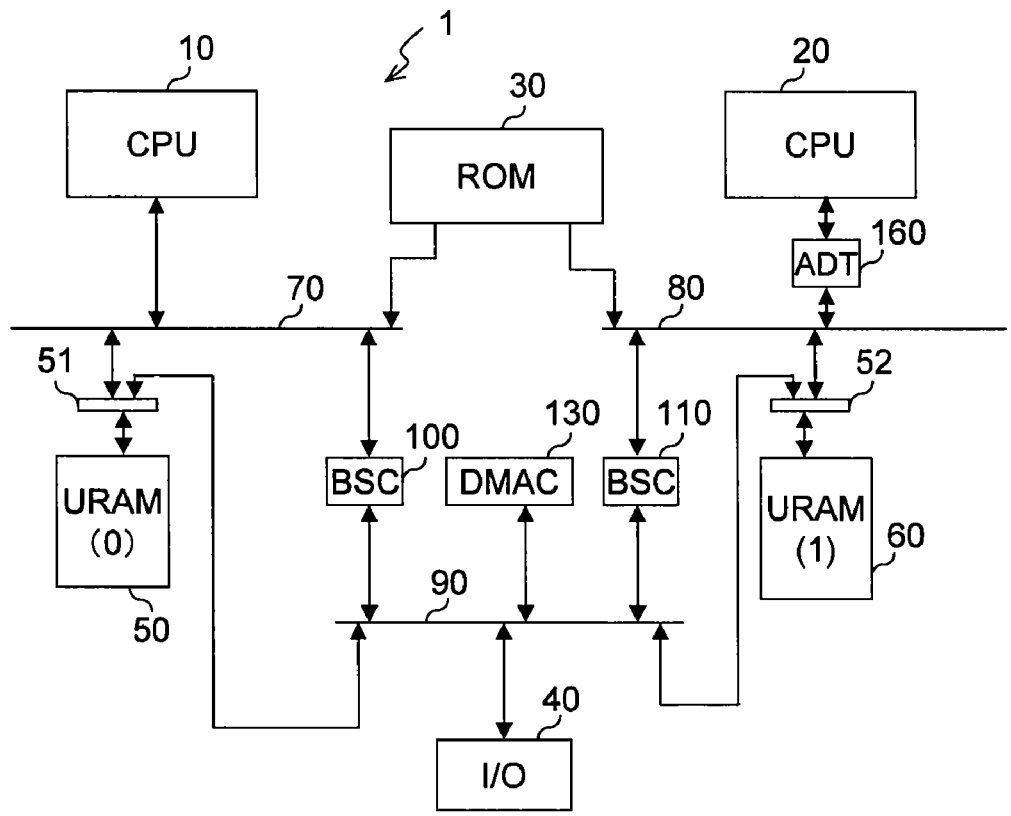
FIG. 1 is a block diagram illustrating an example of the configuration of a microcomputer of the invention.
Figure 2:
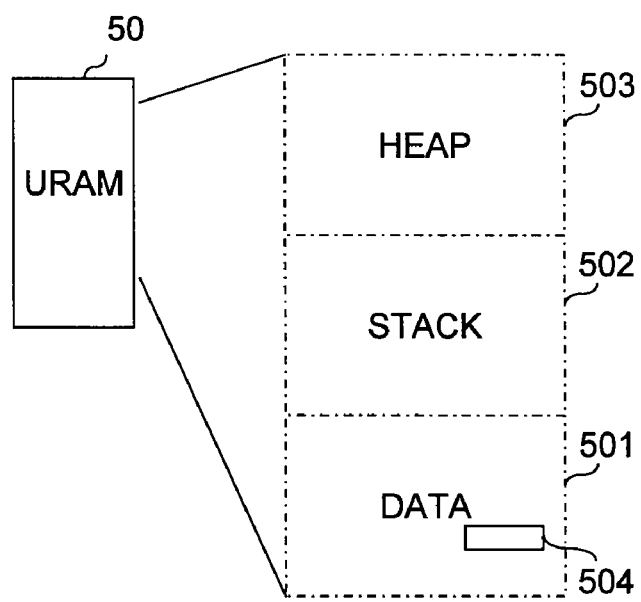
FIG. 2 is an explanatory drawing illustrating information stored in URAM included in the above microcomputer.

First, brief description will be given to preferred embodiments of the invention disclosed in this application. The parenthesized reference numerals in drawings referred to in the brief description of the preferred embodiments just indicate as an example what is contained in the concept of constituent elements marked with the reference numerals.

(1) A microcomputer (1) in a preferred embodiment of the invention includes: a first CPU (10) capable of processing a predetermined task; a first bus (70) joined with the first CPU; a first memory (50) accessible by the first CPU through the first bus; a second CPU (20) capable of processing a predetermined task; a second bus (80) joined with the second CPU; and a second memory (60) accessible by the second CPU through the second bus. The first memory and the second memory are arranged in address spaces individually managed by the first CPU and second CPU corresponding to the memories. In addition, an address translation circuit (160) is included. When a task so programmed that the task has a data area in the first memory is transferred to the second memory and executed by the second CPU, the address translation circuit translates an address outputted from the second CPU so that access to the first memory by the task becomes access to the second memory.

According to the above configuration, the following is implemented when a task so programmed that the task has a data area in the first memory is transferred to the second memory and executed by the second CPU: an address outputted from the second CPU is translated so that access to the first memory by the task becomes to access to the second memory. Therefore, it is possible to use a code common to the first CPU and the second CPU and further carry out access to a static variable as access to the second memory even when a task is executed at the second CPU. As a result, the number of access cycles can be reduced. This avoids degradation in computing capability when a task is transferred between CPUs for load sharing.

(2) A table for storing the address range of a data area with respect to each task and this table can be referred to when a task is executed.

(3) The invention can be so configured that the following is implemented when a task so programmed that the task has a data area in the first memory is processed at the second CPU: the data area in the first memory is copied into the second memory and after the processing of the task is completed at the second CPU, the data area in the first memory is updated with data in the second memory.

(4) The invention is provided with a flag that makes it possible to determine whether the first memory or the second memory retains the latest values in the data area of the task. The invention can be so configured that the following is implemented when an executing CPU does not have a valid data area in its own local memory: the CPU copies the values of the data area from the local memory of the other CPU to its own local memory and, after the completion of execution of the task, changes the flag so that the data area in its own local memory becomes valid.

(5) The address translation circuit can be so configured that the circuit includes: a first register (163) capable of holding the initial address of each task in the first memory; a second register (164) capable of holding information on the size of the task; a third register (165) capable of holding the initial address of each task in the second memory; a determination unit (161) that determines whether or not an address outputted from the second CPU falls within an address range determined by information held by the first register and information held by the second register; and a translation unit (162) that, when an address outputted from the second CPU is within the above address range, carries out address translation by adding information held by the third register to the address outputted from the second CPU.

2. Further Detailed Description of the Preferred Embodiments

More detailed description will be given to embodiments of the invention.

First Embodiment

FIG. 1 illustrates an example of the configuration of a microcomputer of the invention. The microcomputer 1 illustrated in FIG. 1 is of NUMA (Non-Uniform Memory Access) type in which so-called local memories and memory access costs are not uniform. This microcomputer includes: CPUs (Central Processing Units) 10, 20, ROM (Read Only memory) 30, an I/O port 40, URAMs (local memories) 50, 60, multiplexers 51, 52, BSCs (Bus State Controllers) 100, 110, DMAC (Direct Memory Access Controller) 130, and ADT (address translation circuit) 160. However, the configuration of the microcomputer is not specially limited to the foregoing. The microcomputer is formed in one semiconductor substrate, such as a single-crystal silicon substrate, by a publicly known semiconductor integrated circuit manufacturing technology.

The CPUs 10, 20 respectively execute preset tasks. The CPU 10 is joined with a CPU bus 70 and the CPU 20 is joined with a CPU bus 80 through the address translation circuit 160. At the address translation circuit 160, as described in detail later, addresses outputted from the CPU 20 can be translated as required. The ROM 30 has a first port and a second port and stores the tasks executed at the CPUs 10, 20, a task variable table described in detail later, and the like. The first port of the ROM 30 is joined with the CPU bus 70 and the CPU 10 can access the ROM 30 through the CPU bus 70. The second port of the ROM 30 is joined with the CPU bus 80 and the CPU 20 can access the ROM 30 through the CPU bus 80. The URAM 50 is joined with the CPU bus 70 through the multiplexer 51 and the URAM 60 is joined with the CPU bus 80 through the multiplexer 52. The URAMs 50, 60 are randomly-accessible static memories. The URAM 50 is arranged in an address space managed by the CPU 10 and is used as a storage area for varied information required for task execution at the CPU 10. The URAM 60 is arranged in an address space managed by the CPU 20 and is used as a storage area for varied information required for task execution at the CPU 20. The URAMs 50, 60 are respectively joined with a system bus 90 through the multiplexers 51, 52 for path selection. This system bus 90 is joined with the BSCs 100, 110, DMAC 130, and I/O port 40. The BSC 100 controls the bus state between the CPU bus 70 and the system bus 90. The BSC 110 controls the bus state between the CPU bus 80 and the system bus 90. The DMAC 130 acquires the bus right for the system bus 90 and controls DMA transfer between the URAMs 50, 60. The I/O port 40 enables the communication of varied data between this microcomputer 1 and an external source.

In the C language, a programming language frequently used for microcomputers, the memory space is divided into four areas, code, data, stack, and heap. In the code area, programs (tasks) are stored. In this example, programs (tasks) are stored in the ROM 30. In the URAM(0) 50, the data area (DATA) 501, stack area (STACK) 502, and heap area (HEAP) 503 for a program (task) executed at the CPU 10 are formed. The data area (DATA) 501 includes a storage area for the variables 504 of task n. In the stack area (STACK) 502, the return targets of functions and automatic variables (whose content becomes unstable when a subroutine is invoked) are stored; in the data area (DATA) 501, static variables (global variables, local variables) are stored; and in the heap area (HEAP) 503, dynamic variables secured by malloc( ) or the like are stored. In the URAM(1) 60, the data area (DATA), stack area (STACK), and heap area (HEAP) for a program (task) executed at the CPU 20 are formed though not shown in the drawing.

Figures 3, 4:
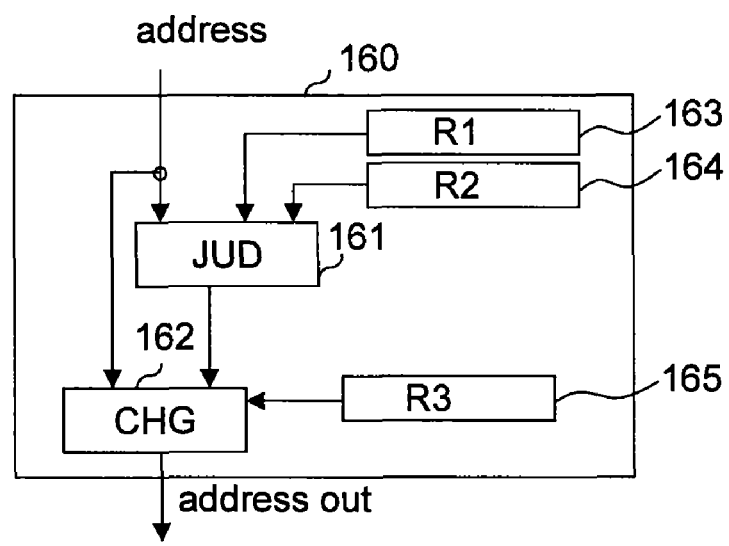
FIG. 3 is an explanatory drawing illustrating an example of the construction of a task variable table referred to when a task is executed in the above microcomputer.
FIG. 4 is a block diagram illustrating an example of the configuration of the address translation circuit included in the above microcomputer.

FIG. 3 illustrates an example of the construction of a task variable table 200 referred to when a task is executed. This task variable table 200 indicates the address at which a static variable is allocated in the data area and the size with respect to each task to be transferred between the CPUs 10, 20. In the task variable table 200 illustrated in FIG. 3, the tasks executed at the CPU 10 or the CPU 20 are discriminated by A, B, C, D, . . . With respect to each task, the initial address (R1) in the URAM(0) 50, the size (R2), the initial address in the URAM 60, and the identification flag (flag) for the valid URAM are set. The identification flag (flag) for the valid URAM indicates the local memory used in the previous task execution. For example, the logical value of the identification flag (flag) for the valid URAM is "0," that indicates that the URAM(0) 50 was used in the previous task execution; and when the logical value of the identification flag (flag) for the valid URAM is "1," that indicates that the URAM(1) 60 was used in the previous task execution. The task variable table 200 is formed in the URAM(0) 50 by the initialization of the microcomputer 1 though not specially limited to this.

FIG. 4 illustrates an example of the configuration of the above address translation circuit 160.

As illustrated in FIG. 4, the address translation circuit 160 includes a determination unit (JUD) 161, a translation unit (CHG) 162, and registers 163 to 165. In the register 163, the initial address (R1) of each task in the URAM(0) 50 is set. In the register 164, the size (R2) of each task is set. In the register 165, the initial address (R3) of each task in the URAM(1) 60 is set. The determination unit 161 determines whether or not the output address (address) of the CPU 20 falls within a predetermined address range. The "predetermined address range" cited here refers to an address range determined by R1 and R2. When the output address of the CPU 20 is not within the predetermined address range, the translation unit 162 outputs the address (address) communicated from the CPU 20 without change (address out) according to an instruction from the determination unit 161. When the output address of the CPU 20 is within the predetermined address range, meanwhile, the translation unit 162 carries out the following processing according to an instruction from the determination unit 161: the translation unit adds an offset address to the address (address) communicated from the CPU 20 and outputs the result of the addition (address out). The offset address cited here refers to the initial address R3 of each task in the URAM(1) 60. As the result of this offset address being added, the output address of the CPU 20 is translated into a corresponding address in the URAM(1) 60.

Description will be given to the operation of the above configuration.

Figure 5:
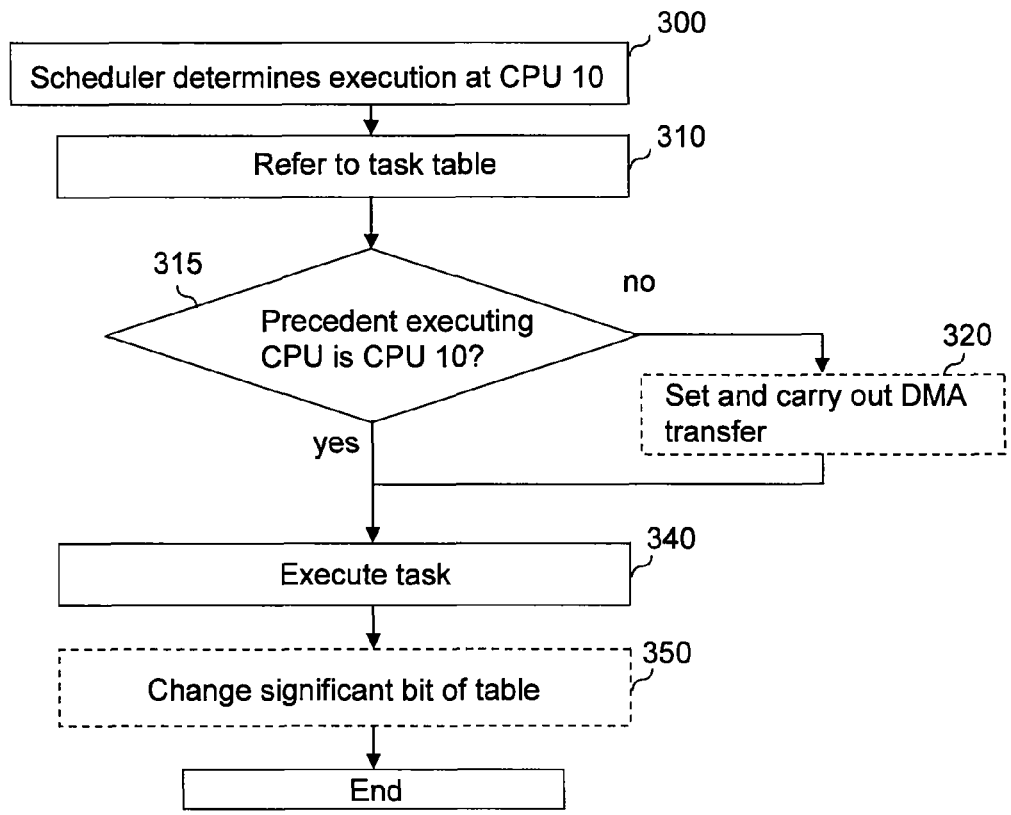
FIG. 5 is a flowchart illustrating a major operation in the above microcomputer.

FIG. 5 illustrates the operation performed when a task scheduler determines execution at the CPU 10.

The task scheduler is operating at the CPU 10 and task management is carried out by this task scheduler.

When at Process 300 the task scheduler determines that the task invoked next should be executed at the CPU 10, the task variable table 200 illustrated in FIG. 3 is referred to at Process 310. At Process 315, it is determined whether or not the precedent executing CPU is the CPU 10. When execution is being carried out at the CPU 10, the flow is branched to Process 340. When execution is being carried out at the CPU 20, the flow is branched to Process 320. At Process 320, setting is made for the DMA transfer of the task static variable from the URAM 50 to the URAM 60 according to the task variable table 200 and DMA transfer is carried out according to this setting. As a result, the data area in the URAM 50 is copied into the URAM 60. Then the flag of the valid URAM for the task in the task variable table 200 is changed to the value (logical value "1") indicating the URAM(1) 60. At Process 320, the address translation circuit 160 is so set as to change the static variable area in the URAM 50 to that in the URAM 60. With respect to access to some address range, this means that an offset is added to an address. At Process 340, the task is executed. The invoked task is executed at the CPU 10. At this time, a common code is used at the CPU 10 and at the CPU 20. The stack area is secured in the stack area of the URAM 60 when the task is started. Though with respect to the static variable, the code of the ROM 30 indicates the code area of the URAM 50, the URAM 60 of the address translation circuit 160 can be accessed. This makes it possible to use a common code at the CPU 20 and at the CPU 10 and yet implement the following even when a task is executed at the CPU 20: static variables (data area 504) and automatic variables (stack area 502) can be accessed as access to the URAM 60 as the local memory of the CPU 20. As a result, the number of access cycles can be reduced. At Process 350, the flag of the valid URAM for the task in the task variable table 200 is changed to the value indicating the URAM 60.

Figure 6:
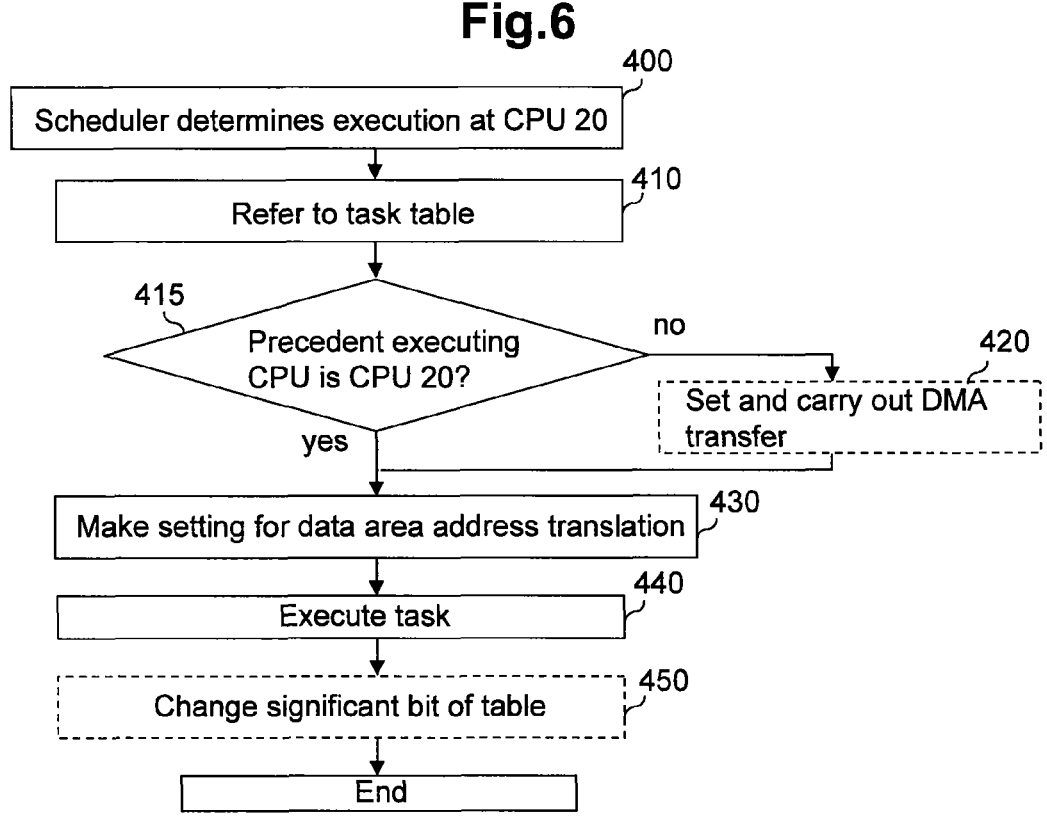
FIG. 6 is a flowchart illustrating a major operation in the above microcomputer.

FIG. 6 illustrates the operation performed when the task scheduler determines execution at the CPU 20.

When at Process 400 the task scheduler determines that the task invoked next should be executed at the CPU 20, the task table 200 illustrated in FIG. 4 is referred to at Process 410. At Process 415, it is determined whether or not the precedent executing CPU is the CPU 20. When execution is not being carried out at the CPU 20, the flow is branched to Process 420. When execution is being carried out at the CPU 20, the flow is branched to Process 430. At Process 420, setting is made for the DMA transfer of the task static variable from the URAM 50 to the URAM 60 according to the task variable table 200 and DMA transfer is carried out according to this setting. At Process 430, the address translation circuit 160 is so set as to change the address of the static variable area in the URAM 60 to that in the URAM 50. With respect to access to some address range, this means that an offset is added to an address. At Process 440, the task is executed. The invoked task is executed at the CPU 20. At this time, a common code is used at the CPU 10 and at the CPU 20. The stack area is secured in the stack area of the URAM 60 when the task is started.

Though with respect to the static variable, the code of the ROM 30 indicates the code area of the URAM 50, the URAM 60 of the address translation circuit 160 can be accessed. This makes it possible to use a common code at the CPU 20 and at the CPU 10 and yet implement the following even when a task is executed at the CPU 20: static variables (data area) and automatic variables (stack area) can be accessed as access to the URAM 60 as the local memory of the CPU 20. As a result, the number of access cycles can be reduced. At Process 450, the flag of the valid URAM for the task in the task variable table 200 is changed to the value indicating the URAM 60.

According to the above example, the following action and effect can be obtained:

It is possible to use a common code at the CPU 20 and at the CPU 10 and further implement the following even when a task is carried out at the CPU 20: static variables (data area 501) and automatic variables (stack area 502) can be accessed as access to the URAM 60 as the local memory of the CPU 20. As a result, the number of access cycles can be reduced. Therefore, it is possible to avoid degradation in computing capability when a task is transferred between CPUs for load sharing.

Second Embodiment

Description will be given to a case where data is written back from the URAM 60 to the URAM 50 each time a task is executed at the CPU 20 as a second embodiment.

FIG. 7 illustrates the flow of this operation. When at Process 500 the task scheduler determines that the task invoked next should be executed at the CPU 10, the task is executed at Process 540. At Process 550, the task significant bit in the task variable table 200 is set to the CPU 10.

Description will be given to a case where the task scheduler determines that the task invoked next should be executed at the CPU 20 with reference to the flowchart in FIG. 8. When at Process 600 the task scheduler determines that the task invoked next should be executed at the CPU 20, the task variable table 200 illustrated in FIG. 3 is referred to at Process 610. At Process 615, it is determined whether or not the precedent executing CPU is the CPU 20. When execution is not being carried out at the CPU 20, the flow is branched to Process 620. When execution is being carried out at the CPU 20, the flow is branched to Process 630. At Process 620, setting is made for the DMA transfer of the task static variable from the URAM 50 to the URAM 60 according to the task variable table 200 and DMA transfer is carried out according to this setting. At Process 630, the address translation circuit 160 is so set as to change access to the address of the static variable area in the URAM 50 to access to that in the URAM 60. With respect to access to some address range, this means that an offset address is added to an address. At Process 640, the task is executed. The invoked task is executed at the CPU 20. At this time, a common code is used at the CPU 10 and at the CPU 20. The stack area is secured in the stack area of the URAM 60 when the task is started. Though with respect to the static variable, the code of the ROM 30 indicates the code area of the URAM 50, the URAM 60 of the address translation circuit 160 can be accessed. This makes it possible to use a common code at the CPU 20 and at the CPU 10 and yet implement the following even when a task is executed at the CPU 20: static variables (data area) and automatic variables (stack area) can be accessed as access to the URAM 60 as the local memory of the CPU 20. As a result, the number of access cycles can be reduced. At Process 650, the flag of the valid URAM for the task in the task variable table 200 is changed to the value indicating the URAM 60. At Process 660, the DMA transfer of the static variable for the task from the URAM 60 to the URAM 50 is carried out based on the task variable table 200. As a result, the static variables in the URAM 50 are constantly updated. When a task is successively executed at the CPU 20, it is unnecessary to carry out the DMA transfer of the static variable for the task from the URAM 50 to the URAM 60.

Up to this point, concrete description has been given to the invention made by the present inventors. However, the invention is not limited to the foregoing and can be variously modified without departing from the subject matter of the invention, needless to add.

For example, the following measure may be taken: after the execution of a task at the CPU 10, DMA transfer from the URAM 50 to the URAM 60 is carried out without fail so that the variables of the task are updated; and after the execution of a task at the CPU 20, DMA transfer from the URAM 60 to the URAM 50 is carried out without fail so that the variables of the task are updated. Thus, when a task is terminated, both the CPUs are identical in the values in their local memories. This makes it possible to immediately execute a task whichever CPU is to execute the task next. As described in relation to the above embodiments, it is made unnecessary to frequently access the local memory of the other CPU by copying a static variable required for computation for a task between local memories. As a result, the processing performance is enhanced. Further, an identical program code can be used in both the CPUs and the code size can be saved.

The task variable table 200 illustrated in FIG. 3 may be divided and stored in different storage media. For example, the following measure may be taken: the initial address R1 or size R2 in the URAM(0) 50 or the initial address R3 in URAM(1) do not require any change and are stored in the ROM 30 and the valid URAM need be updated and is stored in the URAM 50.

What is claimed is:
1. A microcomputer comprising:
a first CPU capable of processing a predetermined task;
a first bus coupled with the first CPU;
a first memory accessed by the first CPU through the first bus and used as a local memory of the first CPU;
a second CPU capable of processing a predetermined task;
a second bus coupled with the second CPU; and
a second memory accessed by the second CPU through the second bus and used as a local memory of the second CPU,
wherein the first memory and the second memory are arranged in address spaces individually managed by the first CPU and the second CPU corresponding thereto,
wherein the microprocessor further comprises an address translation circuit configured to translate an address output from the second CPU so that access to the first memory by the task becomes access to the second memory when a task so programmed that the task has a data area in the first memory is transferred to the second memory and executed by the second CPU, and
wherein the address translation circuit includes
a first register capable of holding the initial address of each task in the first memory;
a second register capable of holding information on the size of the task;
a third register capable of holding the initial address of each task in the second memory;
a determination unit configured to determine whether or not an address output from the second CPU falls within an address range determined by information held in the first register and information held in the second register; and a translation unit configured to carry out address translation by adding information held in the third register to the address output from the second CPU when an address output from the second CPU is within the address range.

2. The microcomputer according to claim 1, further including:

a table storing the address range of a data area with respect to each task, wherein the table is referred to when a task is executed.

3. The microcomputer according to claim 1, wherein when a task so programmed that the task has a data area in the first memory is processed at the second CPU, the data area in the first memory is copied into the second memory and after the completion of processing of the task at the second CPU, the data area in the first memory is updated with data in the second memory.

4. The microcomputer according to claim 1, including:

a flag that makes it possible to determine whether the first memory or the second memory holds the latest values in the data area for the task, and wherein when the executing CPU does not have a valid data area in the local memory thereof, the values in the data area are copied from the local memory of the other CPU to the local memory thereof and after the completion of execution of the task, the flag is changed so that the data area in the local memory thereof is valid.

5. The microcomputer according to claim 2, wherein when a task so programmed that the task has a data area in the first memory is processed by the second CPU, the data area in the first memory is copied into the second memory and after the completion of processing of the task at the second CPU, the data area in the first memory is updated with data in the second memory.

6. The microcomputer according to claim 2, including:

a flag that makes it possible to determine whether the first memory or the second memory holds the latest values in the data area for the task, and wherein when the executing CPU does not have a valid data area in the local memory thereof, the values in the data area are copied from the local memory of the other CPU to the local memory thereof and after the completion of execution of the task, the flag is changed so that the data area in the local memory thereof is valid.

* * * * *